(12) United States Patent
Sherwood et al.

(10) Patent No.: US 9,302,522 B2
(45) Date of Patent: Apr. 5, 2016

(54) PROCESS OF PREPARING PRINTING SOLUTION AND MAKING PATTERNED CIGARETTE WRAPPERS

(75) Inventors: Timothy S. Sherwood, Midlothian, VA (US); Robert N. Smith, Glen Allen, VA (US); Marc W. Rose, Mechanicsville, VA (US)

(73) Assignee: ALTRIA CLIENT SERVICES LLC, Richmond, VA (US)

(*) Notice: Subject to any disclaimer, the term of this patent is extended or adjusted under 35 U.S.C. 154(b) by 1000 days.

(21) Appl. No.: 13/324,747

(22) Filed: Dec. 13, 2011

(65) Prior Publication Data

US 2012/0285477 A1    Nov. 15, 2012

Related U.S. Application Data

(60) Provisional application No. 61/422,525, filed on Dec. 13, 2010.

(51) Int. Cl.
| | |
|---|---|
| *A24D 1/02* | (2006.01) |
| *D21H 11/00* | (2006.01) |
| *D21H 13/00* | (2006.01) |
| *D21H 15/00* | (2006.01) |
| *D21H 17/00* | (2006.01) |
| *D21H 19/00* | (2006.01) |
| *D21H 21/00* | (2006.01) |
| *D21H 23/00* | (2006.01) |
| *D21H 25/00* | (2006.01) |
| *D21H 27/00* | (2006.01) |

(Continued)

(52) U.S. Cl.
CPC .............. *B41M 3/006* (2013.01); *A24D 1/025* (2013.01); *C09D 11/03* (2013.01); *C09D 11/14* (2013.01); *Y10T 428/24802* (2015.01)

(58) Field of Classification Search
None
See application file for complete search history.

(56) References Cited

U.S. PATENT DOCUMENTS

| | | |
|---|---|---|
| 1,555,320 A | 9/1925 | Weil |
| 1,581,451 A | 4/1926 | Knapp |

(Continued)

FOREIGN PATENT DOCUMENTS

| | | |
|---|---|---|
| BE | 779470 A1 | 6/1972 |
| CA | 952656 A1 | 8/1974 |

(Continued)

OTHER PUBLICATIONS

Notification on Results of Substantive Examination dated Nov. 6, 2014 for Russian Appln. No. 2013132160.

(Continued)

*Primary Examiner* — Michael H Wilson
*Assistant Examiner* — Phu Nguyen
(74) *Attorney, Agent, or Firm* — Buchanan Ingersoll & Rooney PC (57) ABSTRACT

A process for making patterned cigarette wrapper includes the steps of: preparing a printing solution including the steps of: mixing at least water and a starch to form a starch mixture, heating the starch mixture to a temperature of at least about 180° F. preferably for at least about 30 minutes to release amylopectin and amylose, adding propylene glycol to the starch mixture, and mixing the starch mixture and propylene glycol to form a printing solution, wherein the solution is maintained and applied at elevated temperature (120° F. to 150° F.). The process also includes providing a base web of wrapper and applying the printing solution to the wrapper in a predetermined pattern.

22 Claims, 7 Drawing Sheets

(51) Int. Cl.
  *B41M 3/00*   (2006.01)
  *C09D 11/03*  (2014.01)
  *C09D 11/14*  (2006.01)

(56) References Cited

U.S. PATENT DOCUMENTS

| | | |
|---|---|---|
| 1,581,619 A | 4/1926 | Sulzberger |
| 1,909,924 A | 5/1933 | Schweitzer et al. |
| 1,996,002 A | 3/1935 | Seaman |
| 1,999,222 A | 4/1935 | Weinberger |
| 1,999,223 A | 4/1935 | Weinberger |
| 1,999,224 A | 4/1935 | Miles |
| 2,013,508 A | 9/1935 | Seaman |
| 2,020,646 A | 11/1935 | Hornstein |
| 2,022,004 A | 11/1935 | Larson |
| 2,049,320 A | 7/1936 | Ruben et al. |
| 2,098,619 A | 11/1937 | Finnell |
| 2,149,896 A | 3/1939 | McArdle et al. |
| 2,246,929 A | 6/1941 | Seney |
| 2,307,088 A | 1/1943 | Whiteley |
| 2,580,568 A | 1/1952 | Matthews et al. |
| 2,580,608 A | 1/1952 | Schur et al. |
| 2,666,437 A | 1/1954 | Lattof |
| 2,718,889 A | 9/1955 | Claussen |
| 2,733,720 A | 2/1956 | Schur et al. |
| 2,754,207 A | 7/1956 | Schur et al. |
| 2,886,042 A | 5/1959 | Hoover et al. |
| 2,976,190 A | 3/1961 | Meyer |
| 2,998,012 A | 8/1961 | Lamm |
| 3,030,963 A | 4/1962 | Cohn |
| 3,106,210 A | 10/1963 | Reynolds |
| 3,370,593 A | 2/1968 | Owaki |
| 3,395,714 A | 8/1968 | Kahane |
| 3,409,021 A | 11/1968 | Owaki |
| 3,477,440 A | 11/1969 | Licis |
| 3,511,247 A | 5/1970 | Tamol |
| 3,517,672 A | 6/1970 | Michelson |
| 3,526,904 A | 9/1970 | Tamol |
| 3,633,589 A | 1/1972 | Kahane et al. |
| 3,640,285 A | 2/1972 | Briskin et al. |
| 3,667,479 A | 6/1972 | Sanford et al. |
| 3,699,973 A | 10/1972 | Tamol et al. |
| 3,705,588 A | 12/1972 | Tamol et al. |
| 3,722,515 A | 3/1973 | Reynolds et al. |
| 3,782,393 A | 1/1974 | Michelson |
| 3,805,799 A | 4/1974 | Stewart, Jr. et al. |
| 3,903,899 A | 9/1975 | Musillo |
| 3,908,671 A | 9/1975 | Cogbill, II |
| 3,911,932 A | 10/1975 | Houck, Jr. et al. |
| 4,020,850 A | 5/1977 | Cogbill, II |
| 4,038,992 A | 8/1977 | Ogasa et al. |
| 4,044,778 A | 8/1977 | Cohn |
| 4,061,147 A | 12/1977 | Falchi |
| 4,077,414 A | 3/1978 | Baker et al. |
| 4,088,142 A | 5/1978 | Horsewell et al. |
| 4,129,134 A | 12/1978 | Hind et al. |
| 4,146,040 A | 3/1979 | Cohn |
| 4,149,550 A | 4/1979 | Green et al. |
| 4,187,862 A | 2/1980 | Cohn |
| 4,193,409 A | 3/1980 | Wahle et al. |
| 4,225,636 A | 9/1980 | Cline et al. |
| 4,230,131 A | 10/1980 | Simon |
| 4,231,377 A | 11/1980 | Cline et al. |
| 4,236,532 A | 12/1980 | Schweizer et al. |
| 4,239,591 A | 12/1980 | Blake |
| 4,277,301 A | 7/1981 | McIntyre et al. |
| 4,286,605 A | 9/1981 | Goslin et al. |
| 4,295,478 A | 10/1981 | Yeatts |
| 4,326,543 A | 4/1982 | Martin et al. |
| 4,340,074 A | 7/1982 | Tudor |
| 4,371,571 A | 2/1983 | McIntyre et al. |
| 4,406,295 A | 9/1983 | Sanford et al. |
| 4,411,279 A | 10/1983 | Martin et al. |
| 4,450,847 A | 5/1984 | Owens |
| 4,452,259 A | 6/1984 | Norman et al. |
| 4,453,553 A | 6/1984 | Cohn |
| 4,480,650 A | 11/1984 | Weinert |
| 4,489,738 A | 12/1984 | Simon |
| 4,590,955 A | 5/1986 | Dixit |
| 4,607,647 A | 8/1986 | Dashley et al. |
| 4,615,345 A | 10/1986 | Durocher |
| 4,619,278 A | 10/1986 | Smeed et al. |
| 4,622,983 A | 11/1986 | Mathews et al. |
| 4,679,575 A | 7/1987 | Yamaguchi et al. |
| 4,691,717 A | 9/1987 | Ikeda et al. |
| 4,716,912 A | 1/1988 | Leonard |
| 4,730,628 A | 3/1988 | Townsend et al. |
| 4,739,775 A | 4/1988 | Hampl, Jr. |
| 4,776,355 A | 10/1988 | Stevenson et al. |
| 4,784,163 A | 11/1988 | Adams et al. |
| 4,784,164 A | 11/1988 | Adams et al. |
| 4,889,145 A | 12/1989 | Adams et al. |
| 4,924,883 A | 5/1990 | Perfetti et al. |
| 4,924,888 A | 5/1990 | Perfetti et al. |
| 4,941,486 A | 7/1990 | Dube et al. |
| 4,942,888 A | 7/1990 | Montoya et al. |
| 4,945,932 A | 8/1990 | Mentzel et al. |
| 4,998,542 A | 3/1991 | Kallianos et al. |
| 4,998,543 A | 3/1991 | Goodman et al. |
| 5,060,675 A | 10/1991 | Milford et al. |
| 5,072,744 A | 12/1991 | Luke et al. |
| 5,074,321 A | 12/1991 | Gentry et al. |
| 5,085,228 A | 2/1992 | Mooney et al. |
| 5,092,353 A | 3/1992 | Montoya et al. |
| 5,094,253 A | 3/1992 | St. Charles et al. |
| 5,101,839 A | 4/1992 | Jakob et al. |
| 5,101,840 A | 4/1992 | Riehl, Jr. |
| 5,103,844 A | 4/1992 | Hayden et al. |
| 5,105,836 A | 4/1992 | Gentry et al. |
| 5,105,838 A | 4/1992 | White et al. |
| 5,107,866 A | 4/1992 | Aronoff et al. |
| 5,109,876 A | 5/1992 | Hayden et al. |
| 5,129,408 A | 7/1992 | Jakob et al. |
| 5,143,098 A | 9/1992 | Rogers et al. |
| 5,144,964 A | 9/1992 | Demain |
| 5,144,966 A | 9/1992 | Washington |
| 5,144,967 A | 9/1992 | Cartwright et al. |
| 5,152,304 A | 10/1992 | Bokelman et al. |
| 5,154,191 A | 10/1992 | Owens, Jr. |
| 5,155,140 A | 10/1992 | Marten et al. |
| 5,168,884 A | 12/1992 | Baldwin et al. |
| 5,170,807 A | 12/1992 | Kasbo et al. |
| 5,178,167 A | 1/1993 | Riggs et al. |
| 5,191,906 A | 3/1993 | Myracle, Jr. |
| 5,220,930 A | 6/1993 | Gentry |
| 5,244,530 A | 9/1993 | Collins et al. |
| 5,263,500 A | 11/1993 | Baldwin et al. |
| 5,263,999 A | 11/1993 | Baldwin et al. |
| 5,271,419 A | 12/1993 | Arzonico et al. |
| 5,329,004 A | 7/1994 | Eden et al. |
| 5,342,484 A | 8/1994 | Cutright et al. |
| 5,345,950 A | 9/1994 | Adebahr et al. |
| 5,396,911 A | 3/1995 | Casey, III et al. |
| 5,415,186 A | 5/1995 | Casey, III et al. |
| 5,417,228 A | 5/1995 | Baldwin et al. |
| 5,450,862 A | 9/1995 | Baldwin et al. |
| 5,450,863 A | 9/1995 | Collins et al. |
| 5,464,028 A | 11/1995 | Takeda et al. |
| 5,465,739 A | 11/1995 | Perfetti et al. |
| 5,474,095 A | 12/1995 | Allen et al. |
| 5,490,875 A | 2/1996 | Wermers et al. |
| 5,490,876 A | 2/1996 | Warmerdam et al. |
| 5,492,568 A | 2/1996 | Warmerdam et al. |
| 5,497,793 A | 3/1996 | Kubica |
| 5,498,224 A | 3/1996 | Kauffman et al. |
| 5,507,304 A | 4/1996 | Maheras et al. |
| 5,523,036 A | 6/1996 | Luke et al. |
| 5,529,619 A | 6/1996 | Warmerdam et al. |
| 5,534,114 A | 7/1996 | Cutright et al. |
| 5,538,018 A | 7/1996 | Chan et al. |
| 5,538,019 A | 7/1996 | Bullwinkel et al. |
| 5,540,242 A | 7/1996 | Chao et al. |
| 5,589,034 A | 12/1996 | Hultman et al. |
| 5,595,196 A | 1/1997 | Salonen et al. |

(56) References Cited

U.S. PATENT DOCUMENTS

| | | |
|---|---|---|
| 5,598,868 A | 2/1997 | Jakob et al. |
| 5,613,505 A | 3/1997 | Campbell et al. |
| 5,641,349 A | 6/1997 | Koubek et al. |
| 5,690,787 A | 11/1997 | Hultman et al. |
| 5,702,555 A | 12/1997 | Caudal et al. |
| 5,709,227 A | 1/1998 | Arzonico et al. |
| 5,730,840 A | 3/1998 | Hampl, Jr. et al. |
| 5,732,718 A | 3/1998 | Douglas et al. |
| 5,820,998 A | 10/1998 | Hotaling et al. |
| 5,824,190 A | 10/1998 | Guerro et al. |
| 5,830,318 A | 11/1998 | Snow et al. |
| 5,878,753 A | 3/1999 | Peterson et al. |
| 5,878,754 A | 3/1999 | Peterson et al. |
| 5,888,348 A | 3/1999 | Hampl, Jr. |
| 5,893,372 A | 4/1999 | Hampl, Jr. |
| 5,911,224 A | 6/1999 | Berger |
| 5,921,249 A | 7/1999 | Hampl, Jr. |
| 5,974,732 A | 11/1999 | Saito |
| 5,985,323 A | 11/1999 | Augello et al. |
| 5,992,420 A | 11/1999 | Moriyama |
| 5,997,691 A | 12/1999 | Gautam et al. |
| 6,020,969 A | 2/2000 | Struckhoff et al. |
| 6,095,152 A | 8/2000 | Beven et al. |
| 6,129,087 A | 10/2000 | Wallace et al. |
| 6,198,537 B1 | 3/2001 | Bokelman et al. |
| 6,305,382 B1 | 10/2001 | Hampl, Jr. |
| 6,397,852 B1 | 6/2002 | McAdam |
| 6,568,403 B2 | 5/2003 | Hampl, Jr. et al. |
| 6,584,981 B2 | 7/2003 | Hampl, Jr. |
| 6,596,125 B2 | 7/2003 | Garg et al. |
| 6,606,999 B2 | 8/2003 | Crooks et al. |
| 6,645,605 B2 | 11/2003 | Hammersmith et al. |
| 6,676,806 B1 | 1/2004 | Butt |
| 6,705,325 B1 | 3/2004 | Hicks et al. |
| 6,725,867 B2 | 4/2004 | Peterson et al. |
| 6,779,530 B2 | 8/2004 | Kraker |
| 6,779,531 B1 | 8/2004 | Biggs et al. |
| 6,789,548 B2 | 9/2004 | Bereman |
| 6,799,578 B2 | 10/2004 | Snaidr et al. |
| 6,823,872 B2 | 11/2004 | Hampl, Jr. |
| 6,837,248 B2 | 1/2005 | Zawadzki et al. |
| 6,929,013 B2 | 8/2005 | Ashcraft et al. |
| 6,959,712 B2 | 11/2005 | Bereman et al. |
| 6,976,493 B2 | 12/2005 | Chapman et al. |
| 6,997,190 B2 | 2/2006 | Stokes et al. |
| 7,047,982 B2 | 5/2006 | Seymour et al. |
| 7,073,514 B2 | 7/2006 | Barnes et al. |
| 7,077,145 B2 | 7/2006 | Seymour et al. |
| 7,115,085 B2 | 10/2006 | Deal |
| 7,116,750 B1 | 10/2006 | Iaquinta et al. |
| 7,117,871 B2 | 10/2006 | Hancock et al. |
| 7,195,019 B2 | 3/2007 | Hancock et al. |
| 7,234,471 B2 | 6/2007 | Fitzgerald et al. |
| 7,237,558 B2 | 7/2007 | Clark et al. |
| 7,237,559 B2 | 7/2007 | Ashcraft et al. |
| 7,240,678 B2 | 7/2007 | Crooks et al. |
| 7,275,548 B2 | 10/2007 | Hancock et al. |
| 7,275,549 B2 | 10/2007 | Hancock et al. |
| 7,276,120 B2 | 10/2007 | Holmes |
| 7,281,540 B2 | 10/2007 | Barnes et al. |
| 7,290,549 B2 | 11/2007 | Banerjee et al. |
| 7,296,578 B2 | 11/2007 | Read, Jr. |
| 7,363,929 B2 | 4/2008 | Fagg et al. |
| 2002/0179105 A1 | 12/2002 | Zawadzki et al. |
| 2002/0179106 A1 | 12/2002 | Zawadzki et al. |
| 2003/0131860 A1 | 7/2003 | Ashcraft et al. |
| 2003/0136420 A1 | 7/2003 | Kraker |
| 2003/0145869 A1 | 8/2003 | Kitao et al. |
| 2003/0217757 A1 | 11/2003 | Edelmann |
| 2004/0025894 A1 | 2/2004 | Beven et al. |
| 2004/0074508 A1 | 4/2004 | McAdam et al. |
| 2004/0099280 A1 | 5/2004 | Stokes et al. |
| 2004/0122547 A1 | 6/2004 | Seymour et al. |
| 2004/0123874 A1 | 7/2004 | Zawadzki et al. |
| 2004/0129281 A1 | 7/2004 | Hancock et al. |
| 2004/0134631 A1 | 7/2004 | Crooks et al. |
| 2004/0168695 A1 | 9/2004 | Snaidr et al. |
| 2004/0173229 A1 | 9/2004 | Crooks et al. |
| 2004/0182407 A1 | 9/2004 | Peterson et al. |
| 2004/0231685 A1 | 11/2004 | Patel et al. |
| 2004/0237978 A1 | 12/2004 | Barnes et al. |
| 2004/0238136 A1 | 12/2004 | Patel et al. |
| 2004/0255966 A1 | 12/2004 | Kraker |
| 2004/0261805 A1 | 12/2004 | Wanna et al. |
| 2005/0000528 A1 | 1/2005 | Bereman |
| 2005/0000529 A1 | 1/2005 | Bereman et al. |
| 2005/0000531 A1 | 1/2005 | Shi |
| 2005/0005947 A1 | 1/2005 | Hampl et al. |
| 2005/0016556 A1 | 1/2005 | Ashcraft et al. |
| 2005/0022833 A1 | 2/2005 | Gedevanishvili et al. |
| 2005/0039767 A1 | 2/2005 | Mua et al. |
| 2005/0051185 A1 | 3/2005 | Rasouli et al. |
| 2005/0056293 A1 | 3/2005 | Zawadzki et al. |
| 2005/0056294 A1 | 3/2005 | Wanna et al. |
| 2005/0066980 A1 | 3/2005 | Crooks et al. |
| 2005/0066982 A1 | 3/2005 | Clark et al. |
| 2005/0066984 A1 | 3/2005 | Crooks et al. |
| 2005/0076925 A1 | 4/2005 | Fagg et al. |
| 2005/0076929 A1 | 4/2005 | Fitzgerald et al. |
| 2005/0081869 A1 | 4/2005 | Biggs et al. |
| 2005/0087202 A1 | 4/2005 | Norman et al. |
| 2005/0103355 A1 | 5/2005 | Holmes |
| 2005/0115575 A1 | 6/2005 | Seymour et al. |
| 2005/0115579 A1 | 6/2005 | Beven et al. |
| 2005/0166936 A1 | 8/2005 | Snaidr |
| 2005/0172977 A1 | 8/2005 | Jadot et al. |
| 2005/0178399 A1 | 8/2005 | Shafer et al. |
| 2005/0186257 A1 | 8/2005 | Manegold et al. |
| 2005/0211259 A1 | 9/2005 | Gedevanishvili |
| 2005/0241659 A1 | 11/2005 | Ashcraft et al. |
| 2005/0241660 A1 | 11/2005 | Ashcraft et al. |
| 2006/0005847 A1 | 1/2006 | Chapman et al. |
| 2006/0011207 A1 | 1/2006 | Chapman et al. |
| 2006/0021625 A1 | 2/2006 | Nyffeler |
| 2006/0021626 A1 | 2/2006 | Mua |
| 2006/0037621 A1 | 2/2006 | Bereman et al. |
| 2006/0124146 A1 | 6/2006 | Stokes et al. |
| 2006/0174904 A1 | 8/2006 | Wanna |
| 2006/0207617 A1 | 9/2006 | Seymour et al. |
| 2006/0231114 A1 | 10/2006 | Oglesby et al. |
| 2006/0237024 A1 | 10/2006 | Reich et al. |
| 2006/0243290 A1 | 11/2006 | Reich et al. |
| 2007/0029060 A1 | 2/2007 | Murray et al. |
| 2007/0051381 A1 | 3/2007 | Hancock et al. |
| 2007/0056600 A1 | 3/2007 | Coleman et al. |
| 2007/0084475 A1 | 4/2007 | Oglesby et al. |
| 2007/0095357 A1 | 5/2007 | Besso et al. |
| 2007/0102017 A1 | 5/2007 | Sherwood et al. |
| 2007/0137668 A1 | 6/2007 | Borschke et al. |
| 2007/0144545 A1 | 6/2007 | Long et al. |
| 2007/0157940 A1 | 7/2007 | Mua et al. |
| 2007/0169786 A1 | 7/2007 | Li et al. |
| 2007/0175058 A1 | 8/2007 | Bengi |
| 2007/0295348 A1 | 12/2007 | Wann |
| 2008/0011312 A1 | 1/2008 | Matsufuji et al. |
| 2008/0295854 A1* | 12/2008 | Li et al. .................. 131/365 |
| 2011/0155158 A1 | 6/2011 | Li et al. |
| 2011/0297168 A1 | 12/2011 | Li et al. |
| 2011/0297169 A1 | 12/2011 | Li et al. |
| 2011/0297736 A1 | 12/2011 | Li et al. |
| 2011/0300299 A1 | 12/2011 | Li et al. |
| 2011/0303233 A1 | 12/2011 | Li et al. |
| 2012/0031417 A1 | 2/2012 | Li et al. |

FOREIGN PATENT DOCUMENTS

| | | |
|---|---|---|
| FR | 2136767 A5 | 12/1972 |
| JP | 2007-131591 A | 5/2007 |
| JP | 2010-529306 A | 8/2010 |
| RU | 63585 U1 | 5/2007 |
| WO | WO 02/37991 A1 | 5/2002 |
| WO | WO 03/088771 A1 | 10/2003 |
| WO | WO 2005/002370 | 1/2005 |

D3

(56) References Cited

FOREIGN PATENT DOCUMENTS

| WO | WO 2006/004343 A1 | 1/2006 |
|---|---|---|
| WO | WO 2007/020532 A1 | 2/2007 |
| WO | WO 2007/031965 A2 | 3/2007 |
| WO | WO 2007/113693 A2 | 10/2007 |
| WO | WO 2008/146159 A8 | 12/2008 |
| WO | WO 2009/004482 A2 | 1/2009 |
| WO | WO 2012/158786 A1 | 11/2012 |

OTHER PUBLICATIONS

Feb. 10, 2015 Chinese Third Office Action issued in Chinese Application No. 201180067377.3 (with English translation).
Mar. 28, 2014 Chinese Office Action issued in Chinese Application No. 201180067377.3.
Jun. 3, 2015 Chinese Fourth Office Action issued in Chinese Application No. 201180067377.3 (with English translation).
Chapman, Simon et al., "Reduction-Ignition Propensity Cigarettes," Aug. 25, 2004, XP55006441, http://wvvw.health.gov.au/internet/main/publishing.nsf/Content/1526AD854C903649CA256F8E0011ACBE/$File/smoking_rip.pdf [retrieved on Sep. 7, 2011].
Glogan, T., "Making fire-safe cigarettes a hot topic", Tobacco Journal International, vol. 2004, No. 2, Mar. 1, 2004, pp. 64-65.
Norman, Alan B. et al., "Measurement of Gas Diffusion Capacity of Cigarette Papers", Beitrage zur Tabakforschung International/Contributions to Tobacco Research, vol. 21, No. 8, pp. 425-434.
Rossel, Stefanie, "Canada's burning issue", Tobacco Journal International, vol. 2005, No. 4, Aug. 1, 2005, pp. 88-91, XP002562192.
"Standard Test Method for Measuring the Ignition Strength of Cigarettes", ASTM International, Designation E2187-4, pp. 1-8, published Aug. 2004.
"Standard Test Method for Measuring the ignition Strength of Cigarettes", ASTM International, Designation E2187-09, pp. 1-8, published Jan. 2010.
Commonly Owned U.S. Appl. No. 13/324,747, filed Dec. 13, 2011.
Commonly Owned U.S. Provisional U.S. Appl. No. 61/064,439, filed Mar. 8, 2009.
International Search Report and Written Opinion mailed Apr. 10, 2012 for PCT/US11/64676.
Supplemental European Search Report dated Sep. 26, 2014 for European Patent Appln. No. 11849346.9.
Official Action dated Mar. 28, 2014 for corresponding Chinese Appln. No. CN201180067377.3.
Oct. 13, 2015 European Communication Pursuant to Article 94(3) EPC issued in European Application No. 11 849 346.9-1302.
Sep. 29, 2015 Japanese Office Action issued in Japanese Patent Application No. 2013-544701 and English translation.

* cited by examiner

PROCESS OF PREPARING PRINTING SOLUTION AND MAKING PATTERNED CIGARETTE WRAPPERS

CROSS REFERENCE TO RELATED APPLICATION

The application claims priority under 35 U.S.C. §119(e) to U.S. provisional Application No. 61/422,525 filed on Dec. 13, 2010, the entire content of which is incorporated herein by reference.

WORKING ENVIRONMENT

Previously developed concepts are set forth in U.S. Ser. No. 12/153,783 filed May 23, 2008, which claims priority to Ser. No. 60/924,676, filed May 25, 2007, the entire content of each of which is incorporated herein by this reference thereto.

FIELD OF THE DISCLOSURE

This disclosure relates generally to a process for making patterned cigarette wrappers including a printing solution. More particularly, the disclosure concerns a process for making patterned cigarette wrapper with a specially formulated oxidized starch printing solution.

SUMMARY OF SELECTED ASPECTS OF THE INVENTION

In a preferred embodiment, a process for making patterned cigarette wrapper includes the steps of: preparing a printing solution, providing a base web of wrapper, and applying the printing solution to the wrapper in a predetermined pattern. Preferably, the step of preparing a printing solution includes: mixing at least water and an oxidized starch to form an aqueous oxidized starch mixture at a temperature of greater than about 70° F., heating the aqueous oxidized starch mixture to a temperature range of at least about 180° F. to about 200° F., more preferably about 195° F., maintaining the temperature of the aqueous oxidized starch mixture for at least about 30 minutes, more preferably at least about 45 minutes, to rupture the starch granules and release the amylose and/or amylopectin, adding propylene glycol to the aqueous oxidized starch solution, and mixing the aqueous oxidized starch solution and propylene glycol to form a printing solution. Preferably, the temperature of the printing solution is maintained for at least about 30 minutes while mixing.

Optionally, the process can include adding calcium carbonate to the printing solution. Preferably, the calcium carbonate is added to the printing solution after the heating and mixing steps and before the printing step.

In the preferred embodiment, the preparing step further includes cooling the printing solution to a temperature ranging from about 120° F. to about 150° F., more preferably about 120° F. to about 140° F., and maintaining this range until used at the time of printing. Preferably, the process also includes agitating the printing solution during the heating and maintaining steps.

Also in the preferred embodiment, the printing solution is applied to the wrapper at a temperature ranging from about 120° F. to about 150° F., more preferably about 120° F. to about 140° F.

In the preferred embodiment, the printing solution has a viscosity ranging from about 40 centiPoises (cP) to about 80 cP as measured by a Brookfiled RVDV-2 viscometer with a #1 spindle at 20 rotations per minute (rpm) when measured at 120° F. More preferably, the viscosity of the printing solution may be adjusted by an addition of hot water and/or heat to a viscosity level at the press of about 18.0+/−1.5 seconds as measured by a Zahn #2 cup at a temperature of about 120° F. Also in the preferred embodiment, the printing solution has a pH in the range of about 4 to about 8. More preferably, the printing solution has a pH of about 7 to about 8 after the addition of calcium carbonate.

Also in the preferred embodiment, the printing solution is applied to the base web in transverse bands to the machine direction or longitudinal direction, i.e., the base web has a transverse direction. The predetermined pattern may include generally parallel bands extending generally transversely on the base web. Preferably, the base web has a longitudinal direction. The predetermined pattern may include a longitudinally extending stripe. Also preferably, the base web has a transverse direction and a longitudinal direction. The predetermined pattern may also include a plurality of regions spaced transversely and spaced longitudinally on the base web.

Also in the preferred embodiment, the printing process is selected from the group comprising gravure printing, flexography, offset printing, inkjet printing, spraying, and die printing. Preferably, the printing process is gravure printing.

Also in the preferred embodiment, the printing solution is applied in a single layer to the base web.

In another embodiment, a smoking article includes a tobacco rod and a wrapper. Preferably, the wrapper is constructed in accordance with a process as described herein.

BRIEF DESCRIPTION OF THE DRAWINGS

Many objects and advantages of this disclosure will be apparent to those skilled in the art when this written description is read in conjunction with the accompanying drawings wherein like reference numerals are applied to like elements and wherein.

DETAILED DESCRIPTION

In a preferred embodiment, a process for making patterned cigarette wrapper paper includes preparing a printing solution, providing a base web of wrapper, and applying the printing solution to the wrapper in a predetermined pattern. The resulting cigarette wrapper provides reduced ignition propensity characteristics for smoking articles fashioned using the cigarette wrapper. Reduced ignition propensity characteristics reflect a lowered capability of an unattended smoking article to cause a substrate to ignite when the smoldering smoking article is inadvertently left on the substrate.

In the preferred embodiment, the predetermined pattern may include at least one band or printed region, such as a transverse band. Preferably, the predetermined pattern may be applied using a printing technique, such as, for example, gravure printing, flexography, offset printing, inkjet printing, spraying, die printing, or the like. Most preferably, the printing technique used may be gravure printing. Preferably, the predetermined pattern is applied in a single pass. In practicing the preferred embodiments, gravure printing of a starch solution on a single-pass basis is made possible, for example, at commercially acceptable printing speeds.

To improve the ignition propensity characteristics of a smoking article fashioned from the wrapper, the pattern is preferably applied with a printing solution containing an oxidized starch and formed by a process as described herein. Preferred printing characteristics and film-forming characteristics of the add-on material may be achieved using an aqueous oxidized starch solution having a viscosity ranging from about 40 centiPoises (cP) to about 80 cP as measured using a Brookfield RVDV-2 viscometer with a #1 spindle at 20 rotations per minute (rpm) as measured at 120° F., more preferably in the range of about 40 cP to about 60 cP. At the press or at time of printing, the viscosity is adjusted by an addition of hot water and/or heat to achieve a preferred final, print solution having a viscosity of about 16.5 to about 19.5 seconds, as measured by a Zahn #2 cup at 120° F., more preferably about 17 seconds to about 19 seconds. Starch employed for the printing solution preferably may be initially mixed with water to form an aqueous starch mixture having a solids content of about 29% to about 34% (by weight), more preferably about 30% to about 33% (by weight). While various starches may be used, for purposes of this invention it is preferred, without limitation, to use an oxidized starch. Preferred oxidized starches include an oxidized tapioca starch, such as FloMax® 8 available from National Starch, LLC. The type (e.g. tapioca) and treatment (e.g. oxidation) provides starch components (e.g. amylose and amylopectin) that are in the preferred molecular weight range.

Preferably, the printing solution also includes 1,2-propylene glycol, in amounts sufficient to abate the tendency of the base web to wrinkle in the course of applying and drying an aqueous starch solution during printing (the "anti-wrinkling" effect of propylene glycol). It is presently understood that this effect is achieved at inclusion levels which result in there being, in the final wrapper, a presence of propylene glycol in the bands at a basis weight level of about 0.3 to 0.5 grams per square meter or more. Further teachings regarding inclusion levels of propylene glycol and other "anti-wrinkling" agents are set forth in commonly assigned, U.S. Patent Application Ser. No. 61/064,439, "Patterned Wrapper with an Anti-Wrinkling Agent," filed Mar. 8, 2009, the content of which is incorporated herein by this reference thereto. A presently preferred solution may comprise propylene glycol in an amount ranging from about 7% to about 10% by weight based on the total solution weight, starch in an amount of about 21% by weight based on the total solution weight, and calcium carbonate in an amount of about 11% by weight based on the total solution weight.

It has been further discovered that at preferred inclusion levels, and upon addition of propylene glycol at or near the conclusion of cooking of the aqueous oxidized starch solution, the propylene glycol has additional beneficial effects. Upon its inclusion in a cooked aqueous starch solution, it abates the tendency of the starch components to retrograde or gel, so as to act as a stabilizing agent. It also provides antimicrobial effects in the resulting printing solution. Both of these effects enhance the shelf life of the printing solution. The enhanced shelf life of the printing solution makes it possible to prepare the solution remotely from where printing operations are to occur and to ship the solution. As will be further explained in the teachings which follow, the operational shelf life of the printing solution is further enhanced by maintaining the printing solution in the range of 120 to 150° F., more preferably about 120° F. to about 140° F., during transit and/or at the time of printing. Furthermore, inclusion of propylene glycol in the process as taught herein also has the effect of reducing the printing solution's viscosity to levels, which further promotes its printability.

In an alternative embodiment, other anti-wrinkling agents can be used in addition to, or in lieu of the propylene glycol. Suitable anti-wrinkling agents include polyols, including without limitation, glycerin, glycerol, polyethylene glycol, glucose, sucrose, isomalt, maltilol, sorbitol, xylitol, and other agents exhibiting comparable functionalities.

Preferably, a conventional filler material, such as calcium carbonate, may be included in the printing solution, as desired, to lighten the printed material to make it less visible on the wrapper and to improve self extinguishment performance of the finished smoking article. Preferably, if included, the calcium carbonate is added to the printing solution just before printing. The calcium carbonate may also help abate wrinkling of the wrapper by reducing the water content in the applied solution. Preferably, the printing solution has a pH in the range of about 4 to about 8, more preferably about 7 to about 8 after calcium carbonate has been added thereto.

Generally, a predetermined pattern of printing solution may be applied to a base web of a wrapper to obtain improved Ignition Propensity ("IP") characteristics and also to obtain improved Self-Extinguishment ("SE") characteristics. Ignition Propensity is a standard test conducted as set forth in ASTM E 2187-04, "Standard Test Method for Measuring the Ignition Strength of Smoking Articles", which is incorporated herein in its entirety by this reference thereto. Ignition propensity measures the probability that a smoking article, when placed on a substrate, will generate sufficient heat to maintain static burning of the tobacco rod. Low values for IP are desirable as such values correlate with a reduced likelihood that a smoldering smoking article will cause ignition in an underlying substrate.

Self-Extinguishment or SE herein is a reference to smoldering characteristics of a smoking article under free burn conditions. To evaluate SE, a laboratory test is conducted at a temperature of 23° C.±3° C. and relative humidity of 55%±5%, both of which should be monitored by a recording hygrothermograph. Exhaust hood(s) remove combustion products formed during testing. Prior to testing, smoking articles to be tested are conditioned at 55%±5% relative humidity and 23° C.±3° C. for 24 hours. Just prior to testing, the smoking articles are placed in glass beakers to assure free air access.

SE testing takes place within an enclosure or test box. A single port smoking machine or an electric lighter is used to ignite the smoking articles for the test. During testing, an apparatus or "angle holder" holds the smoking articles to be tested by holding an end at angles of 0° (horizontal), 45°, and/or 90° (vertical). Preferably, twenty (20) smoking articles are tested at each of the 0°, 45°, and 90° positions. If more than one apparatus is used, the apparatuses are preferably positioned such that the smoking articles face away from each other to avoid cross interference. If a smoking article goes out before the front line of the smoldering coal reaches the tipping paper, the outcome is scored as "self-extinguishment"; on the other hand, if the smoking article continues smoldering until the front line of the smoldering coal reaches the tipping paper, then the outcome is scored as "non-extinguishment". Thus, for example, an SE value of 95% indicates that 95% of the smoking articles tested exhibited self-extinguishment under free burn conditions; while an SE value of 20% indicates that only 20% of the smoking articles tested exhibited self-extinguishment under such free burn conditions.

The SE value may be referred to in terms of "Self-Extinction at 0° value", "Self-Extinction at 45° value", or "Self-Extinction at 90° value", each of which refers to the value of SE at the specified tested angle. In addition, the SE value may be referred to in terms of "Self-Extinction Average value", which refers to an average of the three angular positions: namely, an average of (i) the "Self-Extinction at 0° value", (ii) the "Self-Extinction at 45° value", and (iii) the "Self-Extinction at 90° value". A reference to "Self-Extinction value" or "SE value" does not distinguish between SE at 0°, SE at 45°, SE at 90°, or SE average values and may refer to any one of them.

Furthermore, the predetermined pattern of printing solution is typically applied to a base web having a permeability in the range of about 10 to about 80 CORESTA units. Preferably, the printing solution forms a film on the base web, when dry, that is effective to locally reduce diffusivity values in the range of 0 to about 0.25 centimeters per second (cm/sec) as measured by a Sodium $CO_2$ Diffusivity Tester (available from Sodim SAS of France). To measure the diffusivity of a piece of paper using a Diffusivity Tester, the paper is positioned within a clamping head so that the paper separates two vertically arranged chambers. The upper chamber contains a carrier gas, such as nitrogen, while the lower chamber contains a marker gas, such as carbon dioxide. As there is no pressure difference between the two chambers, any migration of gases is due to differences in concentrations of the gases, and there is no permeability effect, which occurs when a pressure difference is maintained between two surfaces of the paper. After a predetermine period of time (e.g., for about 25 seconds), the concentration of carbon dioxide within the nitrogen stream of the upper chamber is measured in an analyzer. A computer then converts the concentration to diffusivity.

Various balances or trade-offs need to be made in selection of starch parameters for use in applying films to wrapper. For example, while high molecular weight starch may give rise to effective diffusivity reduction, such high molecular weight starches are of lower solubility, and consequently, must be used in lower concentrations, resulting in a printing solution and with very high water content, which elevates drying requirements and exacerbates the wrinkling of the base web.

Figure 1:
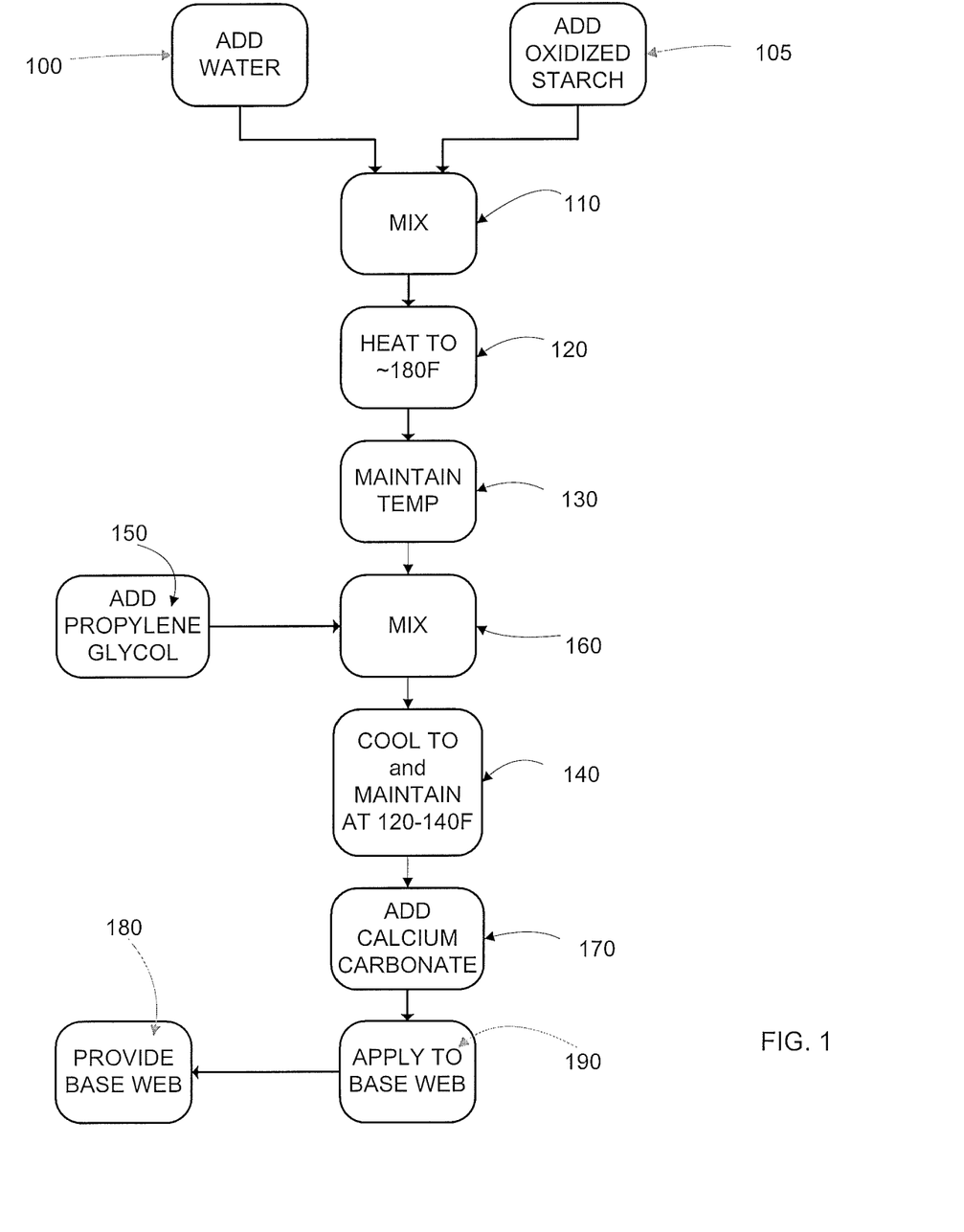
FIG. 1 illustrates process steps for making a printing solution.

In the preferred embodiment, as shown in FIG. 1, the printing solution is prepared by adding water 100 and adding oxidized starch 105 to a container in a batch process. The preferred embodiment provides a batch process. In the batch process, the water and an oxidized starch are mixed (step 110) at about 75° F. at low speeds of about 15 rotations per minute (rpm) to disperse the starch granulars in water and form an aqueous oxidized starch mixture having a pH in the range of about 4 to about 5.5. In the preferred embodiment, the water may be heated to about 75° F. or more before adding (step 105) the oxidized starch thereto. Upon mixing (step 110), the oxidized starch mixture is then heated (step 120) to a temperature in the range of at least about 180° F. to at least about 200° F., more preferably about 195° F. Preferably, the temperature is raised over a preferred time interval of about 60 to about 90 minutes, preferably with agitation so as to assure uniformity. Also preferably, the temperature of the heated oxidized starch mixture is then "cooked" by maintaining (step 130) the solution at the aforementioned selected temperature in the range of about 180° F. to about 200° F., preferably at about 195° F. while mixing for at least about 30 minutes, more preferably at least about 45 minutes. During the heating and maintaining steps, the starch granules (detectable under a microscope) are believed to absorb water, swell, rupture, and release amylose and/or amylopectin into the solution.

After the heating (step 120) and the maintaining (step 130) the temperature of the aqueous oxidized starch solution, the process preferably also includes adding (step 150) propylene glycol to the aqueous oxidized starch solution and mixing (step 160) while holding the temperature substantially constant either at aforementioned, selected temperature, or more preferably, at or about 180° F. If, when adding propylene glycol, it is at room temperature, the temperature of the solution may drop from the aforementioned 195° F. to a temperature of about 180° F. Once the propylene glycol is added (step 150), the aqueous oxidized starch solution is mixed for at least about 30 minutes to thoroughly disperse the propylene glycol throughout the aqueous oxidized starch solution.

Preferably, the aqueous oxidized starch solution is continuously mixed during the heating (step 120), the maintaining (step 130), and after the adding (step 150). Preferably, the propylene glycol is maintained at room temperature or higher before its addition to the aqueous oxidized starch solution. Moreover, the propylene glycol is preferably added as quickly as possible to the aqueous oxidized starch solution. In a batch process, for example, the aqueous oxidized starch mixture can be mixed using low speed, low shear mixing of about 15 rpm in a 1000 gallon tank during the heating (step 120), during the maintaining (step 130), and after the adding propylene glycol to the aqueous oxidized starch solution (step 150). Preferably, the mixing (step 160) is conducted while the solution is at an elevated temperature, preferably at about 180° F. or above.

In an alternative embodiment, the heating (step 120) can be accomplished by use of a jet cooker, which produces cooked starch on a substantially continuous basis "on demand", where liquid heated to at least about 180° C. is jetted against an impaction surface to break-up granular structures of the starch in the liquid.

Not wishing to be bound by theory, it is believed that by maintaining the temperature of the aqueous oxidized starch mixture at or above about 195° F., the starch granules are caused to swell, rupture, and release amylose and/or amylopectin therefrom. By adding propylene glycol thereafter, it is believed that the propylene glycol substantially abates recombination thereof so that the film forming capability of the starch printing solution is preserved for an extended period of time. Moreover, the propylene glycol stays in solution with the starch to provide a substantially homogenous mixture having a low viscosity of less than about 100 cP, more preferably less than about 60 cP, more preferably about 40 cP to about 60 cP when measured using a Brookfield RVDV-2 viscometer with a #1 spindle at 20 rpm at 120° F.

Moreover, it is believed that the addition of propylene glycol to the aqueous oxidized starch solution provides stability and anti-microbial effects, and therefore, improved shelf-life to the printing solution. These effects are evidenced by the solution pH, which does not change (i.e., is substantially constant) for several days after the printing solution has been prepared.

After addition of propylene glycol (step 160) and the mixing (step 110), the printing solution may be cooled (step 140)

to a temperature ranging from about 120° F. to about 140° F. Preferably, the printing solution is maintained at a temperature at about or greater than about 120° F. to avoid agglomeration and viscosity increase. It has been found that as the solution temperature drops below about 120° F., retrogradation accelerates resulting in undesired gelling of the solution. Once the gelling effect begins, the retrograded condition of the solution is irreversible.

At a temperature of about 120° F., the printing solution prior to initiation of printing operations preferably has a viscosity of about 40 cP to about 60 cP as measured using a Brookfield RVDV-2 viscometer with a #1 spindle at 20 rpm at 120° F. Also preferably, at a temperature of about 120° F. the printing solution has a pH of about 4 to about 5. At the press, just prior to initiation of printing operations either an addition of hot water or an increase in temperature (not higher than 150° F.) or both may be used to achieve a desired, final printing viscosity (in the range of about 16.5 to 19.5 sec, more preferably about 17 to 19 sec).

In an embodiment, the printing solution may then be stored in drums/totes and at a temperature of about 120° to about 140° F. until use at the time of printing. The drums/totes can be transported using an insulated blanket or heated truck, as needed, while maintaining the drums at a temperature of at least about 120° F. The drums/totes can also be stored under heated conditions. In the preferred embodiment, the printing solution may also be continuously agitated at low speed during storage. Preferably, the printing solution is used within 72 hours of production. The aforementioned maintenance of temperature, together with the addition of the propylene glycol provide stability to the solution such that a shelf-life of at least 2 or 3 days or longer is achievable.

In the preferred embodiment, the process may also preferably include adding (step 170) calcium carbonate to the printing solution. In the preferred embodiment, about 300 pounds of the printing solution can be mixed with about 40 pounds of water and about 40 pounds of calcium carbonate while mixing for about 15 to about 25 minutes. Preferably, the mixture is mixed using a Neptune impeller at low speed to suspend the calcium carbonate in the mixture, avoid foaming, and form a printing solution. The calcium carbonate is preferably added just before printing so that the calcium carbonate does not settle out of solution.

At the converter/printer, the printing solution can then be pumped to a run drum of a printing press. Preferably, the final printing solution (after addition of water and chalk) has a pH of about 7 to about 8 and a viscosity of about 20 cP as measured using a Brookfield RVDV-2 viscometer with a #1 spindle at 20 rpm at 120° F.

At the press, the process also includes providing a base web of wrapper (step 180) and applying the printing solution to the base web to form a cigarette wrapper (step 190).

In the preferred embodiment, the printing solution allows for higher starch loading to the base web, uses less water, and the propylene glycol has a greater anti-wrinkling effect due to a higher concentration of propylene glycol with respect to the water content. These features synergistically substantially reduce wrinkling of the base web and reduce the viscosity of the printing solution so as to enhance printability. For example, after application to a 33 CORESTA base web for a 6.8 mm wide solid band, with a 27 mm band period, about 0.9 grams per square meter ($g/m^2$) starch, about 0.4 $g/m^2$ propylene glycol and about 0.4 $g/m^2$ calcium carbonate is deposited on the base web.

Also in the preferred embodiment, the printing solution as prepared in the manner described above can be applied to a base web using any of a multitude of printing techniques including, by way of example and without limitation, the group consisting of gravure printing, flexography, offset printing, inkjet printing, spraying, and die printing. Other printing processes may also be suitable and are intended to lie within the teachings of this specification. Preferably, however, gravure printing may be used to apply the printing solution to a base web to obtain a patterned cigarette wrapper.

Figure 2:
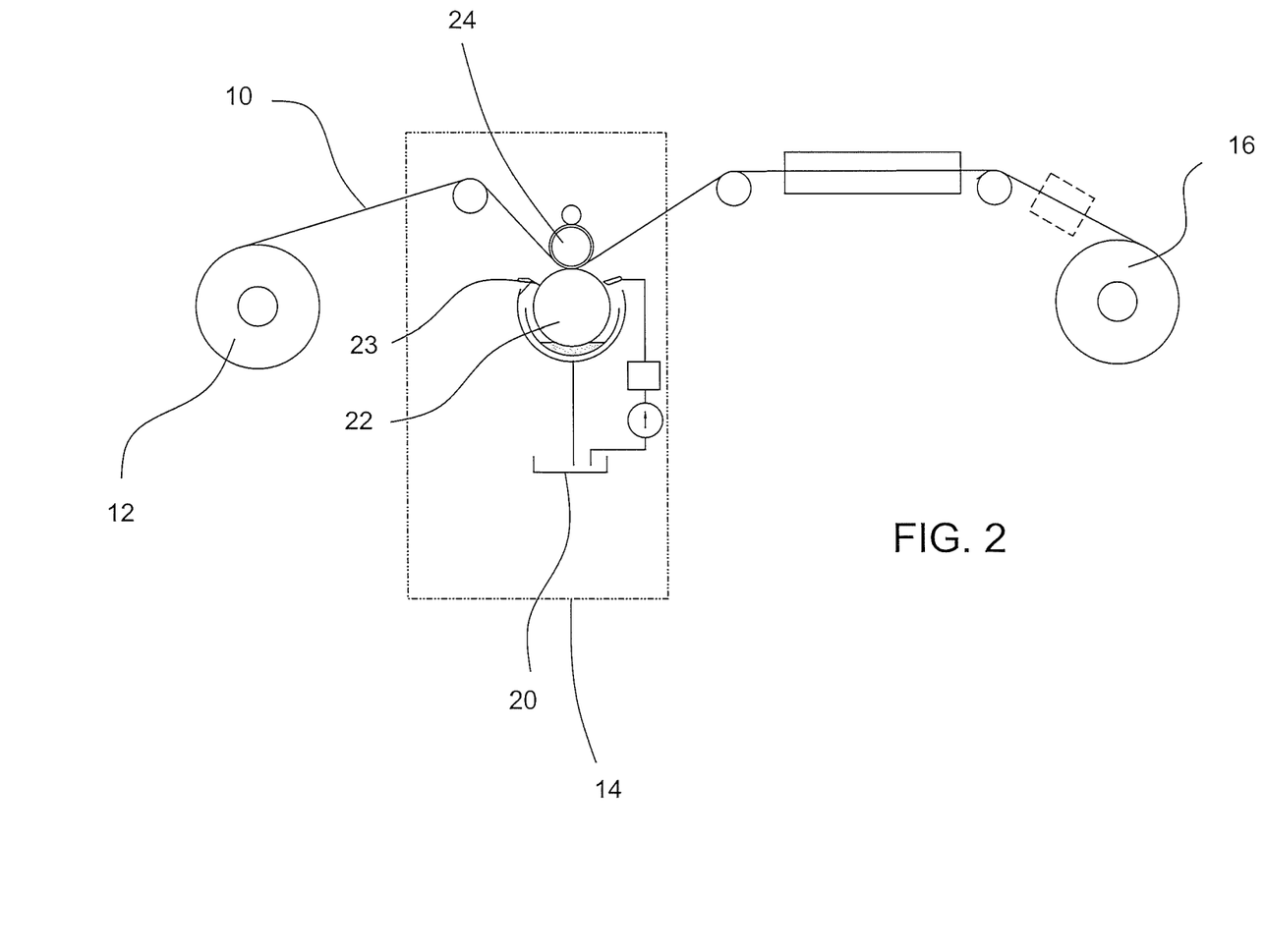
FIG. 2 is a schematic view of a gravure printing system wherein a predetermined pattern of starch solution prepared in accordance with the process of FIG. 1 is applied to the base web 10.

In the preferred embodiment, as shown in FIG. 2, a base web of wrapper 10 may be fed from a roll 12 into a gravure printing system 14 where a predetermined pattern of printing solution prepared in accord with the foregoing specification is applied to the base web 10. The base web 10, with the newly applied and dried predetermined pattern is rolled onto a "press" roll 16. In otherwise conventional steps, the "press" roll 16 of patterned wrapper may be slit into a plurality of individual bobbins which may be used to fashion tobacco rods for use in making smoking articles, such as cigarettes.

The gravure printing system 14 may include one or more printing operations. The printing solution described above may be furnished to a reservoir (or sump) 20 from which it is pumped or otherwise supplied to a print cylinder 22 having a patterned surface corresponding to the desired print pattern. That print cylinder 22 rotates in a bath of the printing solution. As the print cylinder 22 rotates, the printing solution is wiped from the roll surface by a doctor blade assembly 23 so that, as the print cylinder 22 contacts the base web 10 at the nip between the print cylinder 22 and the resiliently faced backing roll 24, the printing solution transfers to the base web with the pattern on the surface of the print cylinder 22.

Figure 3:
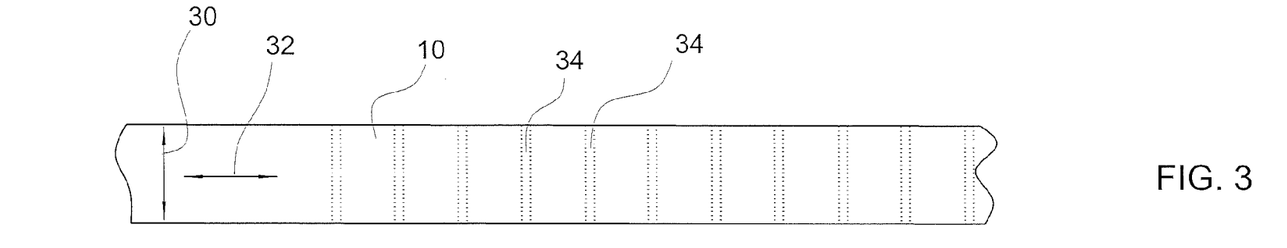
FIG. 3 is a schematic view of a wrapper having transverse printed bands.

Preferably, the base web 10, as shown in FIG. 3, typically has a transverse or cross-web direction (shown by the arrow 30) as well as a longitudinal or machine direction (shown by the arrow 32). Also preferably, the base web 10 typically has both a transverse or cross-web direction as well as a longitudinal or machine direction. As shown, the predetermined pattern of printed material may comprise a single transversely oriented, generally parallel, region or band 34.

Figure 4:
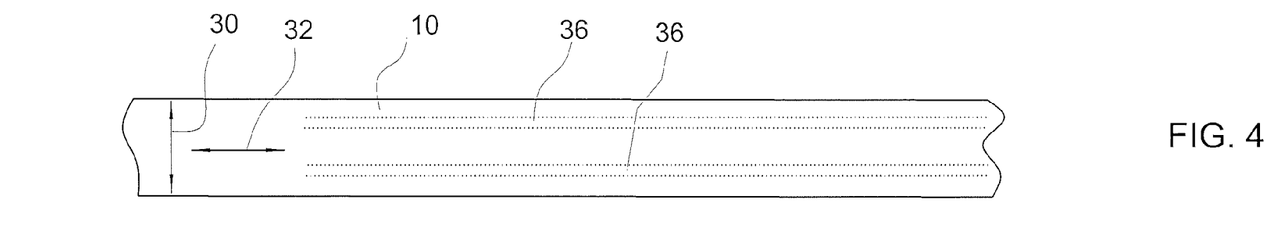
FIG. 4 is a schematic view of a wrapper having a longitudinally printed band.
Figure 5:
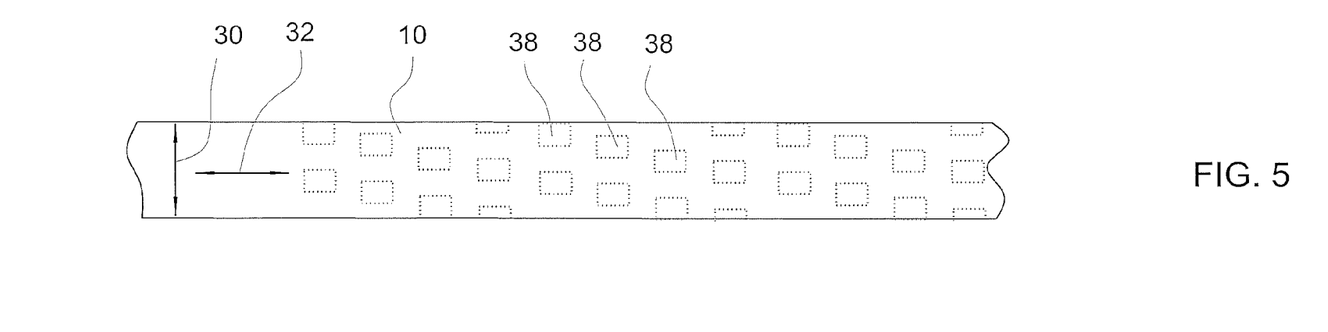
FIG. 5 is schematic view of a wrapper having a plurality of printed regions extending transversely and spaced longitudinally.

In another embodiment, the base web 10 may include a predetermined pattern such as one longitudinally extending region or stripe 36, as shown in FIG. 4, of printed material. If desired, the predetermined pattern may also comprise a two-dimensional array of regions 38, arranged in spaced apart, circumferentially offset rows, as shown in FIG. 5, of printed material spaced along and/or transversely of the base web 10 (a patch pattern).

Figure 6:
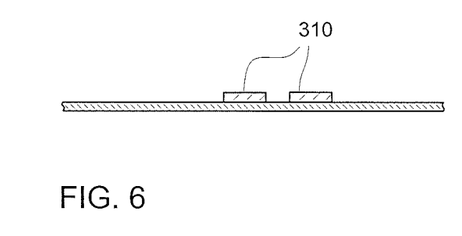
FIG. 6 is an illustration of a slit banded arrangement.

As shown in FIG. 6, the printed material 310 can be applied as a slit-banded configuration, i.e. two or more closely spaced transverse bands in a group with adjacent groups being spaced by a greater distance, such as that described in commonly-owned U.S. Patent Application Publication No. 2008/0295854, the entire content of which is incorporated herein by reference thereto.

Figure 9:
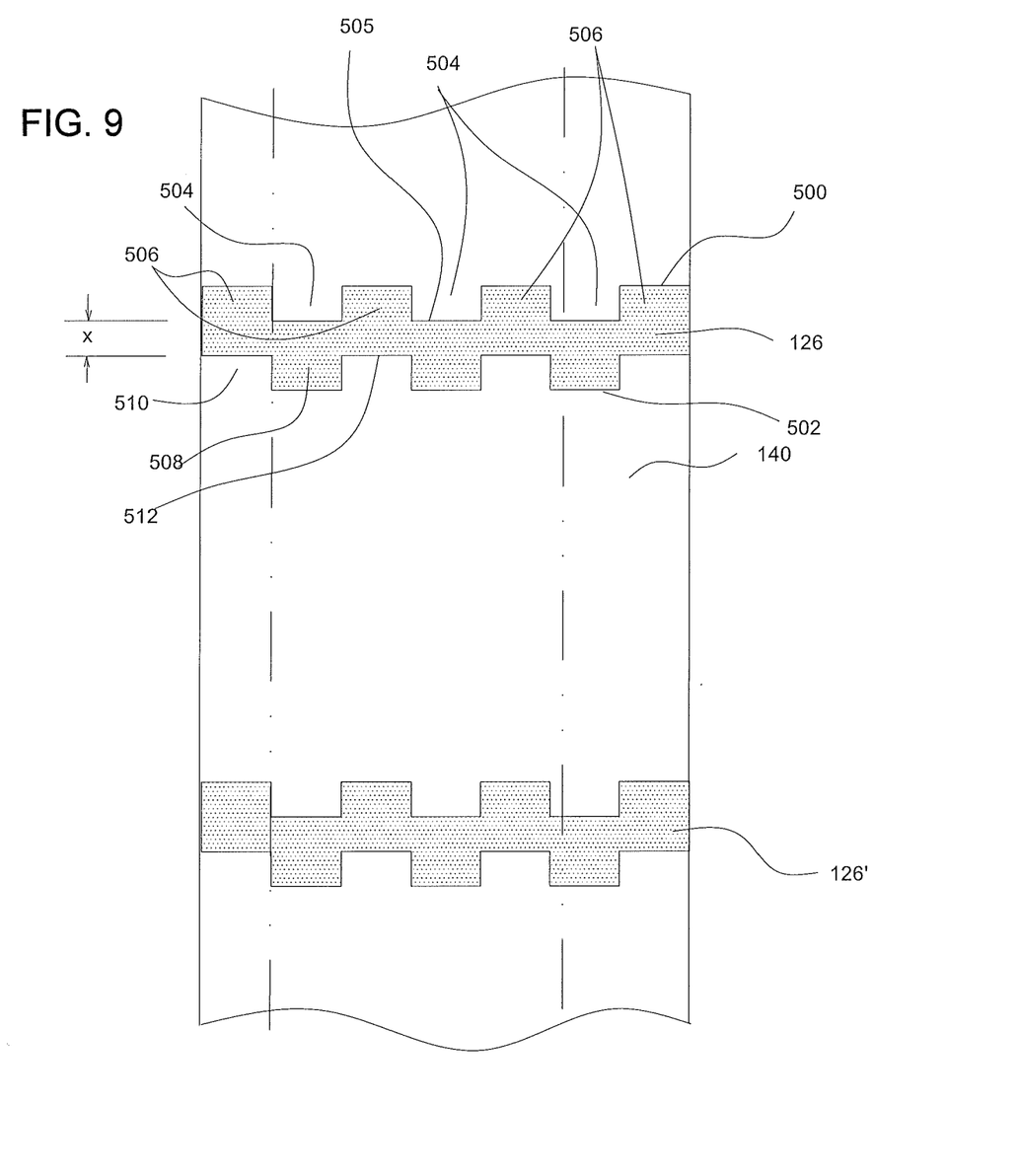
FIG. 9 is a schematic view of a wrapper having a crenellated banded region.

In one embodiment, one or both circumferentially extending edges can be crenellated as shown in FIGS. 49-54 of U.S. Patent Application Publication No. 2008/0295854 and described therein. As shown in FIG. 9, a leading edge 500 of each banded region 126 may be crenellated. Optionally, a trailing edge 502 of the banded region may also be crenellated.

While various arrangements of the crenellated regions may occur to those skilled in the art, one exemplary arrangement is illustrated in the appended figures. For example (see FIG. 9), the banded region 12 may have a leading edge 500 in which the crenels 504 are disposed between merlons 506. In this embodiment, the merlons 506 have a dimension in the transverse direction of the base web 140 which is substantially the same as the dimension in the transverse direction of the crenels 504. As depicted, the merlons 506 and associated crenels 504 may be generally rectangular. If desired, however, the merlons 506 and crenels 504 may have other geometric shapes including, without limitation, quadrilaterals, trapezoids, triangles, hexagons, and other regular or irregular geometric configurations. The distance between the top of a merlon 506 and the bottom of an adjacent crenel 504 may lie in the range of about 2 mm to about 5 mm, and preferably may be about 3 mm. At the trailing edge of the banded region 126, a similarly crenellated arrangement may also be provided.

Figure 7:
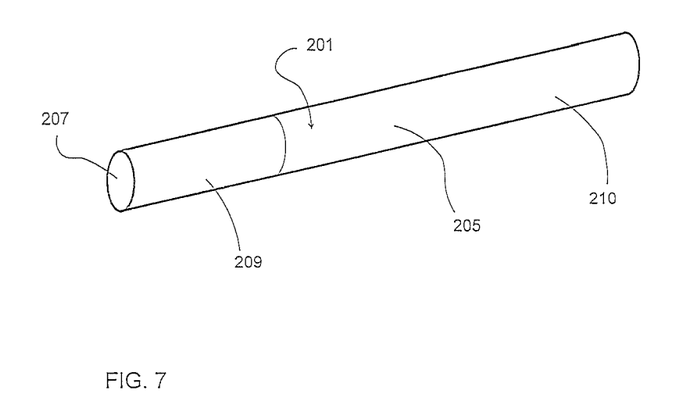
FIG. 7 is a perspective view of a smoking article having a tobacco rod constructed with the wrapper disclosed herein.

As shown in FIG. 7, a smoking article comprises a tobacco rod 205 and a filter 207, which are attached to one another with a tipping paper 209. The tobacco rod 205 includes a wrapper 210 that is constructed in accordance with the teachings herein.

Figure 8:
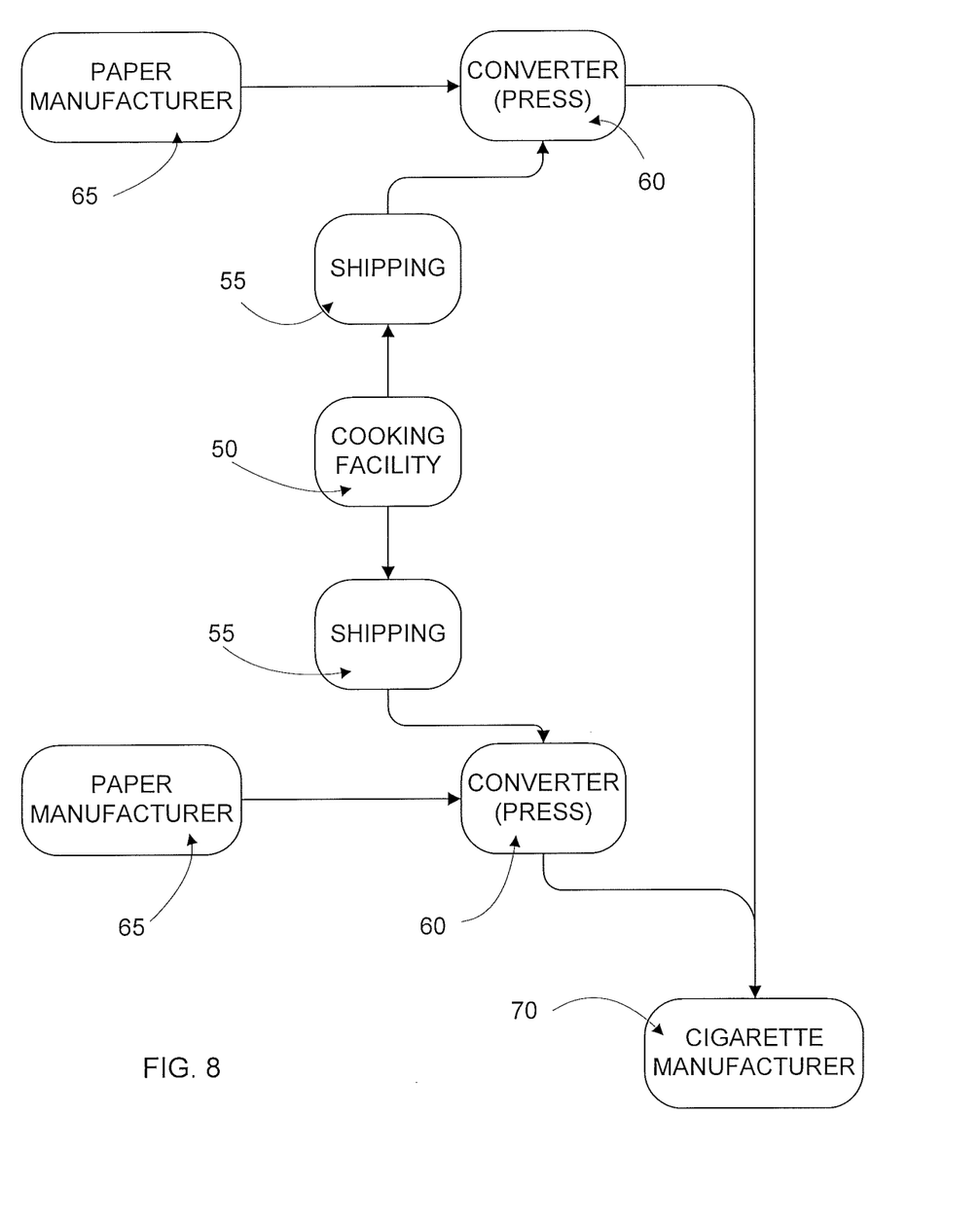
FIG. 8 is a schematic of a currently preferred operational layout of facilities for executing the process of FIG. 1.

FIG. 8 is a schematic of a currently preferred operational layout of facilities for executing the process of making the printing solution described herein. As shown, the printing solution is prepared at a cooking facility 50 and then shipped 55 to one or more paper converters (presses) 60. During shipping, the printing solution is maintained at a temperature of about 120° F. to about 150° F., more preferably about 120° F. to about 140° F., to avoid degradation of the printability (viscosity) and film forming characteristics of the solution. In the preferred embodiment, calcium carbonate can be added to the printing solution at the converter (press) 60 to form the printing solution. The printing solution is then applied to the base web supplied by a paper manufacturer 65. After application of the printing solution to the base web, the base web is slit and resultant bobbins are sent to the cigarette manufacturer 70 for use in manufacturing cigarettes. Accordingly, a single cooking facility 50 may support operations of any number of converters 60, which could simplify production and create savings in operational costs and capital.

In an alternative embodiment, the printing solution can be prepared at the converter (press) 60 so that transport of the solution is not necessary.

In the preferred embodiment, the process for producing the printing solution as described herein is a batch process. In an alternative embodiment, the process can be a continuous process.

The following examples are given to illustrate embodiments of the process described herein and should not be construed to limit the scope of such embodiments.

EXAMPLE 1

Oxidized starch and water are mixed at about 75° F. and heated to about 195° F. for about 45 minutes with low agitation (low shear mixing) to form a mixture. The solution is removed from heat and propylene glycol is added thereto while mixing for about 30 more minutes while maintaining the solution at a temperature of at least about 180° F. The solution is cooled to a temperature of about 140° F. while mixing. The solution is then packed and the temperature of the solution is maintained at a temperature ranging from about 120° F. to about 140° F. and transported to a location of a press.

The solution contains about 31% (by weight) starch, about 10% (by weight) propylene glycol and about 59% (by weight) water. At the press or printing operation, about 300 pounds of the solution is then mixed with 40 pounds hot water and about 40 pounds calcium carbonate to form a printing solution having about 21% (by weight) starch, about 8% (by weight) propylene glycol, about 60% (by weight) water and about 11% (by weight) calcium carbonate to form a final, preferred printing solution.

The solution exhibited desired printability and film-forming characteristics.

EXAMPLE 2

About 51 pounds water heated to a temperature of about 70° F. to about 80° F. is mixed with about 31 pounds of starch powder, such as FloMax® 8 available from National Starch, LLC. The water and starch powder are further mixed while heating for about 45 minutes to a temperature of about 200° F. to form an aqueous oxidized starch solution. About 10 pounds of either condensed steam or additional water heated to about 200° F. is added to the aqueous oxidized starch solution. The aqueous oxidized starch solution is tested using an oven bake method and has a solids content of about 31%. The viscosity is tested using a Brookfield RVDV-2 viscometer with a #1 spindle at 20 rpm at 120° F., and the aqueous oxidized starch solution is found to have a viscosity of about 50 cP. The aqueous oxidized starch solution has a pH of about 4 to about 5.

About 8 pounds of propylene glycol are then added to the aqueous oxidized starch solution and is mixed for about 30 minutes at a temperature ranging from about 180° F. to about 200° F. The printing solution is then cooled to a temperature of about 130° F. The viscosity is tested again using a Brookfield RVDV-2 viscometer with a #1 spindle at 20 rpm at 120° F., and the printing solution is found to have a viscosity of about 45 cP. Such evidences the favorable effect of the propylene glycol to reduce viscosity. The printing solution is kept under substantially constant agitation, the intensity of which is dependent upon tank size, dimensions and agitator type. Calcium carbonate is added while mixing to suspend the calcium carbonate and form a printing solution which is maintained at a temperature of about 120° F. to about 130° F. The printing solution contains about 54.5 pounds of water, about 24.5 pounds of pounds starch, about 10.5 pounds calcium carbonate, and about 10.5 pounds propylene glycol; and has a viscosity of about 17.5 sec to about 18.5 sec as measured by a Zahn #2 cup at 120° F.

As an alternative, turbidity of the aqueous oxidized starch and propylene glycol solution can also be measured to identify changes in the aqueous oxidized starch and propylene glycol solution before viscosity changes are noticed using viscosity measurements. Turbidity measures the amount of light transmitted through a given quantity of material, and can thus be used as a quality control tool to determine if the aqueous oxidized starch and propylene glycol solution should be used or discarded prior to mixing with calcium carbonate. Thus, the turbidity measurement can be used to determine the film-forming capability of the aqueous oxidized starch and propylene glycol solution.

In practicing the preferred embodiment of this invention, the step of maintaining the solution temperature in the range of about 120° to about 150° F. provides numerous advantages including, without limitation, permitting high starch content to be attained and maintained in the aqueous solution and lowering the aqueous solution's viscosity. Accordingly, through use of the temperature maintenance step until the printing step, a desired printing solution is achieved, which solution is suitable for a single pass application to a base web.

When propylene glycol is applied as an anti-wrinkling agent in accordance with this specification, the propylene glycol also counteracts the tendency of certain microorganisms to thrive in a starch solution at a temperature in the range of about 120° to about 150° F.

For gravure printing applications, the phrase "single pass" as used in the specification is intended to mean printing using a single cylinder. For other printing applications, the phrase "single pass" is intended to mean a process where the entire band or pattern is applied at one time.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

Moreover, when the words "generally" and "substantially" are used in connection with geometric shapes, it is intended that precision of the geometric shape is not required but that latitude for the shape is within the scope of the disclosure. When used with geometric terms, the words "generally" and "substantially" are intended to encompass not only features which meet the strict definitions but also features which fairly approximate the strict definitions.

It will now be apparent that a new, improved, and nonobvious process for making patterned wrapper has been described in this specification with sufficient particularity as to be understood by one of ordinary skill in the art. Moreover, it will be apparent to those skilled in the art that numerous modifications, variations, substitutions, and equivalents exist for features of the invention which do not materially depart from the spirit and scope of the invention. Accordingly, it is expressly intended that all such modifications, variations, substitutions, and equivalents which fall within the spirit and scope of the invention as defined by the appended claims shall be embraced by the appended claims.

What is claimed is:

1. A process for making patterned wrapper of a smoking article comprising the steps of:
    preparing a printing solution including the steps of:
        mixing at least water and a starch to form an aqueous starch solution;
        heating the aqueous starch mixture to a temperature of at least about 180° F. for a time sufficient to release at least one of amylopectin and amylose;
        adding propylene glycol to the aqueous starch mixture; and
        mixing the starch mixture and propylene glycol to form a printing solution; and
        providing a base web of wrapper;
    applying the printing solution to the wrapper in a predetermined pattern; and
    between said preparing step and said applying step, cooling to and continuously maintaining the printing solution at a temperature ranging from about 120° F. to about 150° F.

2. The process of claim 1, wherein the mixing step includes incorporating oxidized starch.

3. The process of claim 1, wherein the printing solution is applied to the wrapper at a temperature ranging from about 120° F. to about 150° F.

4. The process of claim 1, wherein the viscosity of the printing solution ranges from about 16.5 seconds to about 19.5 seconds as measured by a Zahn #2 cup at 120° F.

5. The process of claim 1, further including agitating the printing solution during the heating step.

6. The process of claim 1, wherein the printing solution is applied to the wrapper in transversely extending bands.

7. The process of claim 1, wherein the printing solution has a pH in the range of about 4 to about 5 after adding propylene glycol.

8. The process of claim 1, wherein the base web has a transverse direction and wherein the predetermined pattern comprises generally parallel bands extending generally transversely on the base web.

9. The process of claim 1, wherein the base web has a longitudinal direction and wherein the predetermined pattern includes a longitudinally extending stripe.

10. The process of claim 1, wherein the base web has a transverse direction and a longitudinal direction and wherein the predetermined pattern includes a plurality of regions extending transversely and spaced longitudinally on the base web.

11. The process of claim 1, wherein the printing process is selected from the group comprising gravure printing, flexographic printing, offset printing, inkjet printing, spraying, and die printing.

12. The process of claim 11, wherein the printing process is gravure printing.

13. The process of claim 1, wherein the printing solution is applied in at least a single pass to the base web.

14. The process of claim 1, further including adding calcium carbonate to the printing solution.

15. The process of claim 14, wherein the calcium carbonate is added to the printing solution after the heating and maintaining step and before the printing step.

16. The process of claim 1, wherein the printing solution has a viscosity ranging from about 40 cP to about 60 cP after the cooling step.

17. The process of claim 1, wherein during the maintaining step, the temperature is maintained for at least 30 minutes or more.

18. The process of claim 1, wherein the at least water and oxidized starch are mixed at a temperature of about 75° F.

19. The process of claim 1, wherein the oxidized starch mixture has a viscosity of about 50 cP to about 80 cP after the heating step.

20. The process of claim 1, wherein the viscosity of the printing solution is about 16.5 seconds to about 19.5 seconds as measured by Zahn #2 cup at 120° F. at application to a base web.

21. The process of claim 1, wherein propylene glycol is a stabilizing agent and wherein the propylene glycol is added in an amount of about 7% to about 10% by weight based on the weight of the cooked starch solution.

22. The process of claim 1, wherein the printing solution when applied has a solids content of about 21%, the viscosity of the printing solution ranges from about 16.5 seconds to about 19.5 seconds as measured by a Zahn #2 cup at 120° F., and the printing solution is applied to a base web in a single pass.

* * * * *